United States Patent [19]

Salem et al.

[11] Patent Number: 4,568,466

[45] Date of Patent: * Feb. 4, 1986

[54] METHOD FOR PRETREATING AQUEOUS SOLUTIONS WITH WEAKLY ACIDIC CATION EXCHANGE RESINS

[75] Inventors: Eli Salem, Deal, N.J.; Robert Kunin, Yardley, Pa.

[73] Assignee: The Graver Company, Union, N.J.

[*] Notice: The portion of the term of this patent subsequent to Oct. 15, 2002 has been disclaimed.

[21] Appl. No.: 561,458

[22] Filed: Dec. 13, 1983

[51] Int. Cl.$^4$ ............................................. C02F 1/42
[52] U.S. Cl. .................................... 210/663; 210/670; 210/681; 210/777
[58] Field of Search ............... 210/670, 681, 685, 686, 210/777, 778, 663

[56] References Cited

U.S. PATENT DOCUMENTS 3,475,330 10/1969 Gilles .................................... 210/681
3,527,718 9/1970 Coburn ................................. 210/686
3,779,386 12/1973 Ryan .................................... 210/777
3,985,648 10/1976 Casolo .................................. 210/686

Primary Examiner—Ivars Cintins
Attorney, Agent, or Firm—Dressler, Goldsmith, Shore, Sutker & Milnamow, Ltd.

[57] ABSTRACT

A method for treating aqueous solutions by ion exchange uses a weakly acidic cation exchange resin to remove ammonia and other volatile amines along with corrosion products and metal ion leakage from a solution while substantially reducing the quantity of acid required to regenerate the cation exchange resin. The solution can be passed through a conventional mixed bed comprising a strongly acidic cation exchange resin and a strongly basic anion exchange resin after the pretreatment.

36 Claims, 6 Drawing Figures

Fig-3-

METHOD FOR PRETREATING AQUEOUS SOLUTIONS WITH WEAKLY ACIDIC CATION EXCHANGE RESINS

TECHNICAL FIELD

The present invention relates to a method for pretreating an aqueous solution by ion exchange using a weakly acidic cation exchange resin to remove ammonia and other volatile amines along with corrosion products and metal ion leakage from the solution while substantially reducing the quantity of acid required to regenerate the cation exchange resin. The solution can be passed through a conventional mixed bed comprising a strongly acidic cation exchange resin and a strongly basic anion exchange resin after the pretreatment.

BACKGROUND OF THE INVENTION

Ion exchange can be defined as the reversible interchange of ions between a solid (an ion exchange resin) and a liquid (usually an aqueous solution) in which there is no permanent change in the structure of the solid. Ion exchange resins are synthetic resins containing active substituents (usually sulfonic, carboxylic, phenolic, phosphonous, phosphonic or substituted amino groups) that give the resin the property of combining with or exchanging ions between the resin and a solution. For example, a cation exchange resin with active sulfonic groups in the hydrogen form will exchange its hydrogen ions with, for example, the sodium, calcium, magnesium and other metal ions present in water.

The customary procedure is to pass the liquid through a bed of the ion exchange resin, which is a granular and porous solid and has only a limited capacity for exchanging ions. When the useful exchange capacity of the cation exchange resin is exhausted, the resin can be regenerated with an acid, preferably a strong acid, which removes the accumulated metal ions. Simultaneously, the cation exchange resin takes on an equivalent amount of hydrogen ions in exchange, thus restoring itself to the original hydrogen form. The acid generally used for this regeneration is dilute sulfuric acid. Hydrochloric acid is also an excellent, but usually more expensive, regenerant. An anion exchange resin can be regenerated with a strong base, such as sodium hydroxide.

Mixed bed systems and precoated filter systems containing both anion and cation exchange resins have been used in many industrial applications for the purification of aqueous solutions. A primary application of such systems is in the purification of water for condensate recirculation systems used to drive steam turbines. It is essential that the water be extremely pure to avoid any adverse effects on the surfaces of blades, boilers and pipes of the high pressure steam system. Since it is desired to produce water that is free of any residue upon evaporation, the cation exchange resin should preferably be in the hydrogen form, and the anion exchange resin should be in the hydroxide form.

As used herein, the term "bed" refers to a layer of filtration or ion exchange material, such as a column of ion exchange resin beads or a precoat layer, which has been deposited on a filter support including a filter screen, an annular filter cartridge, a film, a deep or shallow bed and the like. In general, a shallow bed is preferred over a deep bed so that the pressure drop within the bed is minimized.

A particular problem with single or mixed bed ion exchange systems of the type conventionally employed is the production of ion "leakage," particularly sodium ion leakage. The term "leakage" refers to any ions that are not removed from the water by the ion exchange resin and, thus are permitted to "leak" past the ion exchange resin. As used herein, the term "leakage" also refers to any undesired ions, such as sodium, which are introduced into the water by elution of ions from the ion exchange resin which have not been removed during regeneration.

In a mixed bed system, the leakage problem arises primarily from the difficulty of obtaining perfect separation of the anion and cation exchange resins in the bed before regeneration of the ion exchange resins. As used herein, the term "separation" refers to the bulk classification of ion exchange resins within a single vessel or zone. As is familiar to those skilled in the art, such separation is usually accomplished by passing water upwardly through the ion exchange resins. This stream of water stratifies the mixture of the ion exchange resins by carrying the less dense strongly basic anion exchange resin to the top of the separation vessel, while the more dense weakly acidic cation exchange resin remains in the bottom portion of the vessel.

While the above method is effective for separating the bulk of the ion exchange resins, perfect separation cannot be achieved. A primary source of this difficulty is the ion exchange resin fines produced during handling of the ion exchange resins. Since upflow separation depends upon particle size along with density, the cation exchange resin fines will not sink to the bottom of the separation vessel, but will be carried upwardly with the strongly basic anion exchange resin. When the two ion exchange resins are subsequently isolated from one another, and the anion exchange resin is regenerated with sodium hydroxide, sodium ions will be introduced into the ion exchange sites in the cation exchange resin contaminant. When the ion exchange resins are returned to the service column, the sodium ions will be introduced into the water being treated, producing sodium leakage.

The leakage problem is aggravated when substances such as ammonium hydroxide, ammonia or volatile amines are added even in trace amounts to the steam of a high pressure boiler or turbine system as is conventional to minimize corrosion. The ammonium ions gradually convert the cation exchange resin to the ammonium form and promote the release of sodium ions. Moreover, the amines often appear in the condensate and reduce the capacity of the cation exchange resin to remove corrosion products and traces of ions produced by leakage from the condensate.

In addition, the use of a single or mixed bed including a strongly acidic cation exchange resin requires the use of a large excess of fresh or unused acid to regenerate the resin. That disadvantage can be overcome, according to the present invention, by use of a weakly acidic cation exchange resin to pretreat the condensate thereby removing metal ions and ammonia before passage of the condensate through a mixed bed including strongly basic anion exchange resins.

As will be described in greater detail with reference to the Detailed Description of the Invention, the effective application of a weakly acidic cation exchange resin in a single bed to remove metal ions and ammonia is contrary to the results one skilled in the art would expect upon reviewing the published literature.

SUMMARY OF THE INVENTION

The present invention relates to a method for pretreating aqueous solutions such as recirculated condensate from turbine systems by ion exchange using a weakly acidic cation exchange resin to remove ammonia and other volatile amines along with corrosion products and metal ion leakage from a solution while substantially reducing acid consumption in regeneration of the cation exchange resin. The solution can be passed through a conventional mixed bed comprising a strongly acidic cation exchange resin and a strongly basic anion exchange resin after the pretreatment.

As used herein, the term "weakly acidic cation exchange resin" refers to a resin having an apparent dissociation constant or ionization constant ($pK_a$) between about 3.5 and 5.8 as measured by conventional methods. [See, for example, Fisher et al., *J. Phys. Chem.*, 60, 1030 (1956)]. The term "strongly acidic cation exchange resin," on the other hand, refers to a resin having a $pK_a$ less than about 3.5. The volatile amines removed from a solution passed through a mixed bed formed according to the present invention should have a $pK_b$ less than about 5.0.

The method comprises:

(a) preparing a bed of filter materials including a cation exchange resin having a $pK_a$ in the range of about 3.5 to 5.8; and (b) passing a liquid through the bed at a temperature less than 200° F. and at a linear flow rate less than 75 gallons per minute per square foot to substantially remove impurities from the liquid.

The liquid can then be passed to a mixed bed comprising a strongly acidic cation exchange resin and a strongly basic anion exchange resin for treatment in a conventional manner under condensate polishing conditions. The weakly acidic cation exchange resin can be regenerated with a lower quantity of a dilute acid solution than would be required to regenerate a strongly acidic cation exchange resin used under similar conditions.

In an alternative embodiment, a porous support means can be precoated with a slurry comprising the above cation and anion exchange resins in a finely divided state to form a precoat layer. Thereafter the liquid can be passed through the precoat layer and the porous support means for purification. The porous support means can comprise a tubular or annular filter element, filter screen or filter bed. In a preferred embodiment, the precoat support means includes wound layers of yarn or other strand material including nylon, orlon, polypropylene, cotton and the like. The precoating step is accomplished as set forth in U.S. Pat. No. 3,779,386 to Ryan, which patent is assigned to the assignee of the present invention and which is incorporated herein by reference.

In preferred practice, the cation exchange resin is in the hydrogen form. By way of background, weakly acidic cation exchange resins have been prepared by a variety of procedures and encompass a large number of functional groups and structures. Functional groups can include carboxylic, phenolic, phosphonous and phosphonic entities of a rather wide range of acid strength. The most common weakly acidic cation exchange resins are those prepared by reacting an unsaturated carboxylic acid such as acrylic, methacrylic or maleic acid with a crosslinking agent such as divinylbenzene or ethylene dimethacrylate. Normally, an ester of the acid is used in the suspension polymerization process, and the acid ester is subsequently hydrolyzed.

The anion exchange resin used in the mixed bed described herein is preferably strongly basic and in the hydroxide form, with the ratio by dry weight of anion exchange resin to cation exchange resin in the mixed bed being between 3 to 1 and 1 to 3.

Operation of a single pretreatment bed system according to the present invention reduces the quantity of acid required to regenerate the weakly acidic cation exchange resin by a factor of more than 3 and minimizes the degree of sodium leakage relative to a single bed system comprising a strongly acidic cation exchange resin or a mixed bed system comprising a strongly acidic cation exchange resin and a strongly basic anion exchange resin.

The total concentration of metal ion impurities remaining in the effluent after passage through the pretreatment bed is less than about 10 parts per billion. In particular, the concentration of sodium ions in the effluent is less than about 1 part per billion which, depending on the influent concentration of sodium ions, represents better than ninety percent removal.

Not all weakly acidic cation exchange resins are effective in the present method. Thus, the following description includes the criteria for selecting the proper weakly acidic cation exchange resins for use in the present invention from a number of commercially available resins.

DETAILED DESCRIPTION OF THE INVENTION

Figure 1:
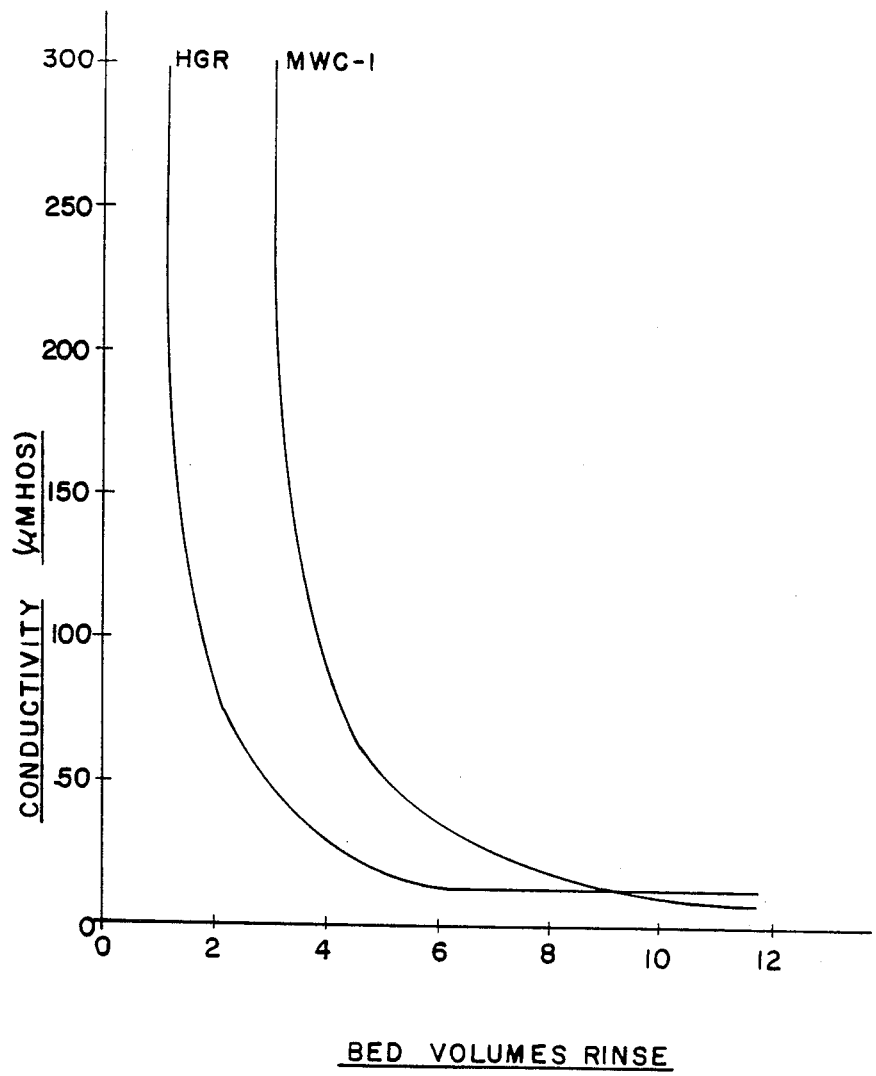
FIG. 1 is a graph showing representative rinse down curves for a weakly acidic cation exchange resin having a $pK_a$ less than about 5.8 (Dowex MWC-1) and a strongly acidic cation exchange resin (Dowex HGR W2).

According to the present invention, weakly acidic cation exchange resins can be employed in a single bed or a precoat filter system to remove ammonia and other volatile amines along with corrosion products and metal ion leakage, and can be completely regenerated with only a slight excess of acid. Strongly acidic cation exchange resins such as sulfonated styrene-divinylbenzene copolymer products, on the other hand, require a relatively large excess of acid for regeneration and, unless completely regenerated, such resins are prone to metal ion leakage and, in particular, sodium leakage.

The prior art, as exemplified by Simpson et al., Proceedings of the 44th International Water Conference, Engineer's Society of Western Pennsylvania (Oct. 24-26, 1983), indicates that weakly acidic cation exchange resins exhibit poor small particle ion exchange kinetics whereas condensate polishing requires good ion exchange kinetics. In fact, the prior art does not even suggest the use of weakly acidic cation exchange resins for condensate polishing or under condensate polishing conditions; i.e., high flow rates (25-75 gpm/ft$^2$) and low concentrations of total dissolved solids (TDS).

It is well known that strongly acidic cation exchange resins can effectively remove ammonia from water at both high and low concentrations. Moreover, weakly acidic cation exchange resins have been used to remove ammonia from various solutions having ammonia concentrations in excess of hundreds and thousands parts per million (ppm). However, there is little, if any, indication in the prior art that weakly acidic cation exchange resins are capable of effectively removing ammonia or volative amines from the condensates of high purity condensates such as those encountered in the industrial power applications.

In addition, while it would be advantageous to use weakly acidic cation exchange resins whenever possible because of their excellent regeneration efficiencies, the prior art indicates that such cation exchange resins would not be effective at removing ammonia from condensates, particularly at elevated temperatures. For that matter, the same prior art would suggest that it would be difficult to use a weakly acidic cation exchange resins to remove traces of other cations such as sodium under these same operating conditions.

On pages 36-37 of *Ion Exchange Resins*, written by one of the inventors of the present invention, Robert Kunin, titration curves are used to illustrate that the effective capacity of a strongly acidic cation exchange resin is essentially unchanged with variations in ionic strength or metal ion concentration. However, that is not the case for a weakly acidic cation exchange resin. Although the data illustrate the effect on such monovalent ions as sodium and potassium ions, the effect on the ammonium ion would even be more dramatic since the binding of a weak base such as ammonia to a weak acid is less strong than that of a strong base to a weak acid. Moreover, since the basic strength of ammonia or any volatile amine decreases with increasing temperature, the decrease in effectiveness of a weakly acidic cation exchange resin for removing ammonia should further decrease with temperature.

The effect of concentration on the removal of ammonia at low concentrations is further illustrated in the commercial literature [Engineer's Manual, Rohm and Haas Co. (1977)]. Here again, according to the information presented on page 32A-2 of that reference, one would conclude that the capacity for ammonia would be negligible at concentrations below 100 ppm. In essence, one would infer from the prior art that carboxylic or weakly acidic cation exchange resins would be effective primarily for hardness alkalinity. Further, one would also anticipate that monovalent cations such as sodium ions would only be effectively removed by such cation exchange resins in alkaline media having at least modest cation concentrations (greater than 100 ppm).

In reviewing the prior art, it is most important to appreciate the fact that strongly acidic cation exchange resins have been effectively used for removing ammonia and volatile amines from condensates. However, the regeneration efficiencies of such resins are poor and unless the resin is regenerated completely with copious quantities of acid, excessive sodium leakage will occur. From an efficiency standpoint, one skilled in the art might consider using a weakly acidic cation exchange resin; however, the prior art indicates that such resins do not perform well under condensate polishing conditions. In support of this point, it should be noted that both strongly and weakly acidic cation exchange resins have been commercially available for years; however, weakly acidic cation exchange resins have not been used for condensate polishing even though the need for such an efficient resin has long existed.

In selecting the proper cation exchange resin for removing ammonia and volatile amines from condensates, a cation exchange resin must have an acidity that is sufficiently low to permit regeneration with high efficiency but sufficiently high so as to effectively remove ammonia. The acidity of an ion exchange resin is usually expressed in terms of its $pK_a$ value; i.e. the negative logarithm of the ionization constant, $K_a$, of the cation exchange resin and can be expressed as follows:

$$pK_a = -\log K_a$$

The ionization constant $K_a$ is a measure of the degree of ionization of the acid form of the cation exchange resin. The greater the value of the ionization constant, the greater is the acid strength. Of course, as the ionization constant increases, the $pK_a$ will decrease. Hence, in terms of $pK_a$, a cation exchange resin with as high a $pK_a$ as possible should be used provided the resin is still able to remove ammonia and volatile amines at elevated temperatures as high as 140°-150° F.

If only carboxylic acid-type weakly acidic cation exchange resins are considered, the $pK_a$ of the weakly acidic cation exchange resin should be less than a value of about 5.8. A non-halogenated derivative of a carboxylic acid-type weakly acidic cation exchange resin usually exhibits a $pK_a$ greater than about 5.0. A halogenated derivative of a carboxylic acid-type weakly acidic cation exchange resin, on the other hand, exhibits a $pK_a$ greater than about 4.0. If the $pK_a$ of the resin is significantly greater than about 5.8, the process will not operate efficiently.

If weakly acidic cation exchange resins such as phosphonic and phosphonous acid resins are considered, the lower end of the $pK_a$ range would be 3.5. Below that value, regeneration efficiency of the resin is poor. As a result, the weakly acidic cation exchange resin of the present invention should have a $pK_a$ from about 3.5 to about 5.8.

In addition, temperature plays a significant role in the method of the present invention. As the temperature is increased, the overall operating capacity of the resin is decreased but the utilization of the equilibrium capacity is increased. These data can be used to ascertain the temperature above which use of the present method would be impractical. From the following examples, it can be seen that the present method can be operated efficiently at temperatures as high as 200° F. In preferred practice, the present method is performed at a temperature in the range of about 115°-140° F.

The following examples are intended to illustrate the present invention, and should not be construed as limiting since the scope of the invention is determined with reference to the appended claims.

EXAMPLE 1 (Runs 1-4)

Three weakly acidic cation exchange resins and one strongly acidic cation exchange resin were evaluated for ammonia removal capacity under typical condensate polishing conditions; specifically, at a relatively high flow rate, low inlet concentration of impurities and elevated temperature.

The three weakly acidic resins evaluated in this example were DUOLITE C-464 macroporous (Diamond Shamrock Chemical Co., Cleveland, Ohio), AMBERLITE IRC-84 gel (Rohm and Haas Co., Philadelphia, Pa.) and DOWEX MWC-1 macroporous (Dow Chemical Co., Midland, Mich.), are representative acrylic acid-divinylbenzene type cation exchange resins having $pK_a$s less than about 5.8. These resins were selected on the basis of excellent osmotic shock resistance and high capacity. Additional weakly acidic cation exchange resins that are suitable for use in the present invention include Lewatit CNP (Bayer, West Germany) and Ionac CC (Ionac Chemical Co., Birmingham, NJ).

DOWEX HGR W2 (Dow Chemical Co., Midland, Mich.) was selected for comparison purposes as a typical strongly acidic styrene-divinylbenzene type cation exchange resin having sulfonic acid active groups. Other suitable strongly acidic cation exchange resins include Dowex HGR-S (Dow Chemical Co., Midland, Mich.), Amberlite IR-120 (Rohm and Haas Co., Philadelphia, PA.) and Ionac C-267 (Ionac Chemical Co., Birmingham, NJ).

Columns having an internal diameter of 1.5 inches were each filled with a resin to an 18 inch bed height as a preliminary test of the efficiency of each resin. Single element pilot plant feed tanks and pumps were used to feed ammonia at a rate of 2 parts per million (ppm) in a solution maintained at a pH of 9.6 and a temperature of 80°-140° F. Ammonia influent and effluent conductivity were continuously monitored by conventional methods using a conductivity recorder. Flow meters and needle valves were used to monitor and control the flow rate through each column. This technique for controlling the flow rate was sometimes less than satisfactory since flow tended to drop off during the runs as the pressure increased. In general, however, flow conditions were approximately 0.4 gallons per minute (gpm), 33 gpm/ft$^2$ and 21 gpm/ft$^3$. (See Table 1).

Dilute sulfuric acid (4–5% by weight) was used to regenerate each resin at a dosage approximately equal to four times (4×) the stoichiometric amount necessary for complete regeneration of the resin, except in three tests as shown in Table 1 in which 1.2× the stoichiometric amount was tested. Regeneration was done manually, using a separatory funnel to gravity feed the regenerant for a contact time of at least one hour. Each resin was rinsed at 1 gpm/ft$^2$, and the effluent was monitored using a Beckman conductivity bridge and a flow-through cell.

Capacities were calculated from run length, influent ammonia and effluent ammonia as determined by conductivity measurements. Calculated equilibrium capacities were verified where possible by determining the mass balance on spent regenerant using ammonia electrode and back titration techniques.

TABLE 1

| Run No. | Resin[1] | Cycle No. | Regen. Level (Percent) | Operating Temp. (°F.) |
|---|---|---|---|---|
| 1 | Dowex HGR W2 | 1 | 400 | 80 |
|   | Duolite C-464 | 1 | 400 | 80 |
| 2 | Dowex HGR W2 | 2 | 120 | 90 |
|   | Amberlite IRC-84 | 1 | 400 | 90 |
| 3 | Amberlite IRC-84 | 2 | 120 | 95 |
|   | Dowex MWC-1 | 1 | 400 | 95 |
| 4 | Dowex MWC-1 | 2 | 120 | 140 |
|   | Amberlite IRC-84 | 3 | 400 | 140 |

[1]Resins were subjected to one exhaustion/regeneration cycle prior to testing, except for Duolite C-464 which was not precycled. Each resin was used as received from the manufacturer with no screening or backwashing.

Table 2 lists the results obtained for ammonia removal with the cation exchange resins under the foregoing conditions of low inlet concentration, relatively high flow rate and elevated temperature. The exchange capacity, pressure drop ($\Delta P$) and run length were determined for each resin.

Under the column in Table 2 entitled "Run Length", the subheading "Break" refers to the breakthrough point which is the time (usually expressed in hours) during operation of the bed at which some of the material to be adsorbed by the resin passes through the entire depth of the bed without being adsorbed and appears in the effluent. After the breakthrough point, the effluent concentration of the material to be adsorbed by the resin increases with time until it equals the concentration of that material at the inlet of the bed. At this time, the entire bed has a sorbed-phase concentration in equilibrium with the effluent concentration, and the bed is referred to as being exhausted. In a similar manner, under the column entitled, "Capacity", the subheading "Break" refers to the breakthrough ion exchange capacity (equivalents per liter) of the resin tested.

TABLE 2

| Resin | Cycle No. | Temp. (°F.) | Capacity[1] (eq/l) Break | Capacity[1] (eq/l) Equil. | $\Delta P$ (psi) Initial | $\Delta P$ (psi) Final | Run Length (hrs) Break | Run Length (hrs) Equil |
|---|---|---|---|---|---|---|---|---|
| HGR W2 | 1 | 80 | 1.73 | 1.85 | 4.4 | 4.4 | 74 | 99 |
|  | 2 | 80 | 0.90 | 0.95 | 4.2 | 4.2 | 40 | 50 |
| C-464 | 1 | 80 | 0.92 | 1.33 |  |  | 41 | 66 |
| IRC-84 | 1 | 90 | 1.28 | 1.42 | 6.0 | 14.5 | 48 | 76 |
|  | 2 | 90 | 1.23 | 1.37 | 9.5 | 17 | 48 | 81 |
|  | 3 | 140 | 1.46 | 1.59 |  |  | 45 | 67 |
| MWC-1 | 1 | 90 | 1.48 | 1.60 | 6.5 | 10.5 | 62 | 91 |
|  | 2 | 140 | 1.51 | 1.63 |  |  | 52 | 74 |

[1]Calculated capacities are expressed as equivalents per liter. Several values were verified by mass balance measurements on the spent regenerant.

Good ion exchange capacities were obtained with Amberlite IRC-84 and Dowex MWC-1; 28 and 32 kilograins per cubic foot (kgr/ft$^3$), respectively, to an ammonia breakthrough at 90° F. These capacities represent approximately 30% of the total exchange sites on Amberlite IRC-84 and approximately 38% for Dowex MWC-1. The 38 kgr/ft$^3$ capacity obtained for the strongly acidic cation exchange resin Dowex HGR W2, is approximately 78% of its total available exchange sites.

Duolite C-464, which had a low breakthrough capacity, 20 kgr/ft$^3$ (approximately 36% of the total exchange sites), did not rinse down after regeneration and was eliminated from further testing. High capacities were retained after 120% regeneration of both Amberlite IRC-84 and Dowex MWC-1 and both resins showed reasonable conductivity upon rinse down.

FIG. 1 is a comparison of representative Dowex MWC-1 and Dowex HGR W2 rinse curves. Although Dowex MWC-1 required a greater rinse volume (about 2.5 bed volumes) than Dowex HGR W2 (about 1.7 bed volumes) to effect an effluent conductivity of 100 micromhos, the two curves were very similar after 6 bed volumes of rinse. For example, the rinse volume requirement to achieve an effluent conductivity less than 10 micromhos was about 7.5 bed volumes for Dowex MWC-1 and about 8.5 bed volumes for Dowex HGR W2.

The high capacities obtained for both resins at 140° F., compared to the capacities obtained at 90° F., may be due either to the lower area flow rate which would mask the temperature effect observed in a later testings or to inaccurately controlled flow rate throughout the preliminary testing.

As expected, Amberlite IRC-84 and Dowex MWC-1 developed a high pressure drop during exhaustion as compared to Dowex HGR W2. After 72 hours of operation, after which approximately 90 percent of each resin was exhausted, the pressure drop for Dowex MWC-1 was 10.5 psi (pounds per square inch) and for Amberlite IRC-84 was 15 psi, which is a change from an initial reading of 6 psi. Dowex HGR W2 remained at 4.5 psi throughout the entire run.

EXAMPLE 2 (Runs 5-11)

Based on the results of Example 1, Dowex MWC-1 was selected for further testing (see Table 3). A pilot plant, with a 4 inch internal diameter column, was operated under conditions similar to those described in Example 1, but at a bed height of 36 inches and with an increased flow rate: 50 gpm/ft$^2$ (the volumetric flow rate expressed in terms of gpm/ft$^3$ remained the same as in Example 1).

The flow rate was regulated with a control valve and was verified with a flow meter, so that the flow rate remained relatively constant during each run. Sodium removal was evaluated in Runs 10 and 11, with influent and effluent sodium being measured with an Orion SLED analyzer. The effect of temperature was determined over the range of 100° to 140° F.

TABLE 3

| Run No. | Dowes MWC-1 Resin | Cycle No. | Operating Temp. (°F.) | Actual Bed Height (Inches) |
|---|---|---|---|---|
| 5 | screen, backwash | 1 | 140 | 33 |
| 6 | same resin #5 | 2 | 140 | 33 |
| 7 | same resin #6 | 3 | 120 | 33 |
| 8 | as received | 1 | 100 | 36 |
| 9 | same resin run #8 | 2 | 120 | 36 |
| 10 | same resin run #9 | 3 | 140 | 36 |
| 11 | same resin run #10 | 4 | 120 | 36 |
| 12 (mixed bed) | same resin run #11 backwashed | 5 | 90 | 18 and |
| | SBRP, as received | 1 | | 18 |

Table 4 lists the results obtained with Dowex MWC-1 over the temperature range 100° to 140° F. As previously indicated, a higher flow rate (50 gpm/ft$^2$) was used in these runs as compared to the runs of Example 1. Ammonia influent, however, remained the same at 2 ppm and the pH of the ammonia feed solution was 9.6. Sodium removal was also investigated.

Temperature, as expected, had a marked effect on resin performance, affecting equilibrium capacity and thereby run lengths, as well as extent of utilization at the ammonia breakthrough point. Temperature did not appear to directly effect effluent quality. Ammonia concentrations in the effluent during each run ranged from 3 to 11 ppb as NH$_3$, conductivity from 0.07 to 0.14 micromhos (adjusted to 25° C.) and pH between 5 to 6.

TABLE 4

| | (Runs 55-9) DOWEX MWC-1 | | | | |
|---|---|---|---|---|---|
| Run No. | 5 | 6 | 7 | 8 | 9 |
| Temperature (°F.) | 140 | 137 | 120 | 100 | 119 |
| Bed Height (inches) | 33.5 | 32 | 32 | 36 | 36 |
| Influent NH$_3$ (ppm as NH$_3$) | 1.9 | 2.2 | 2.2 | 2.2 | 2.1 |
| Effluent NH$_3$ (ppb) | 6-11 | 7-9 | 3 | 7 | 7 |
| Effluent conductivity (micromhos) | 0.09-0.14 | 0.10-0.12 | 0.055 | 0.10 | 0.10 |
| Effluent pH | 5.6 | — | — | 5.2-5.6 | 4.6-5.7 |
| Run length (hrs) | | | | | |
| to break | 49 | 45 | 58 | 79 | 60 |
| to equil. | 61 | 56 | 70 | 120 | 88 |
| Capacity (eq/l) | | | | | |
| at break | 0.823 | 0.854 | 1.10 | 1.28 | 1.04 |
| at equil. | 0.905 | 0.970 | 1.34 | 1.79 | 1.24 |
| ΔP initial (psi) | 10 | 13 | 15 | 27 | 30 |
| ΔP final[1] (psi) | 21 | 21 | 21 | 41 | 37 |
| exchange zone (inches) | 6.6 | 6.3 | 5.5 | 12.3 | 11.5 |

[1]For the equilibrated resin, the pressure drop (ΔP) was relieved and was then remeasured to compensate for wall effects.

Figure 2:
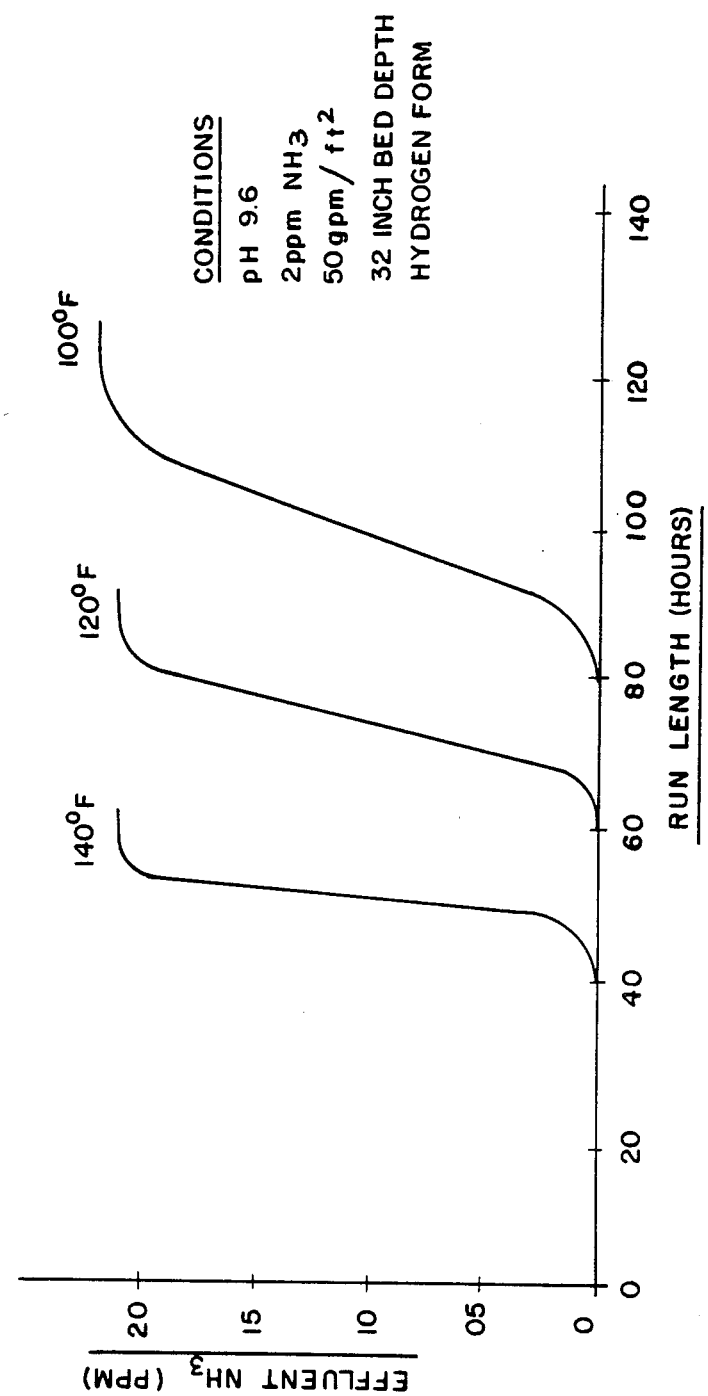
FIG. 2 is a graph showing the effect of temperature on the run length of a weakly acidic cation exchange resin (Dowex MWC-1).

FIG. 2 shows the run lengths obtained at various temperatures. Increasing the temperature from 100° F. to 140° F. reduced the run length by about 50 percent. Temperatures higher than 140° F. are not expected under normal operating conditions. However, at temperatures over 140° F. the capacity (and run length) of the resin gradually decreases, and the resin would eventually be thermally regenerated with little or no ammonia capacity.

Figure 3:
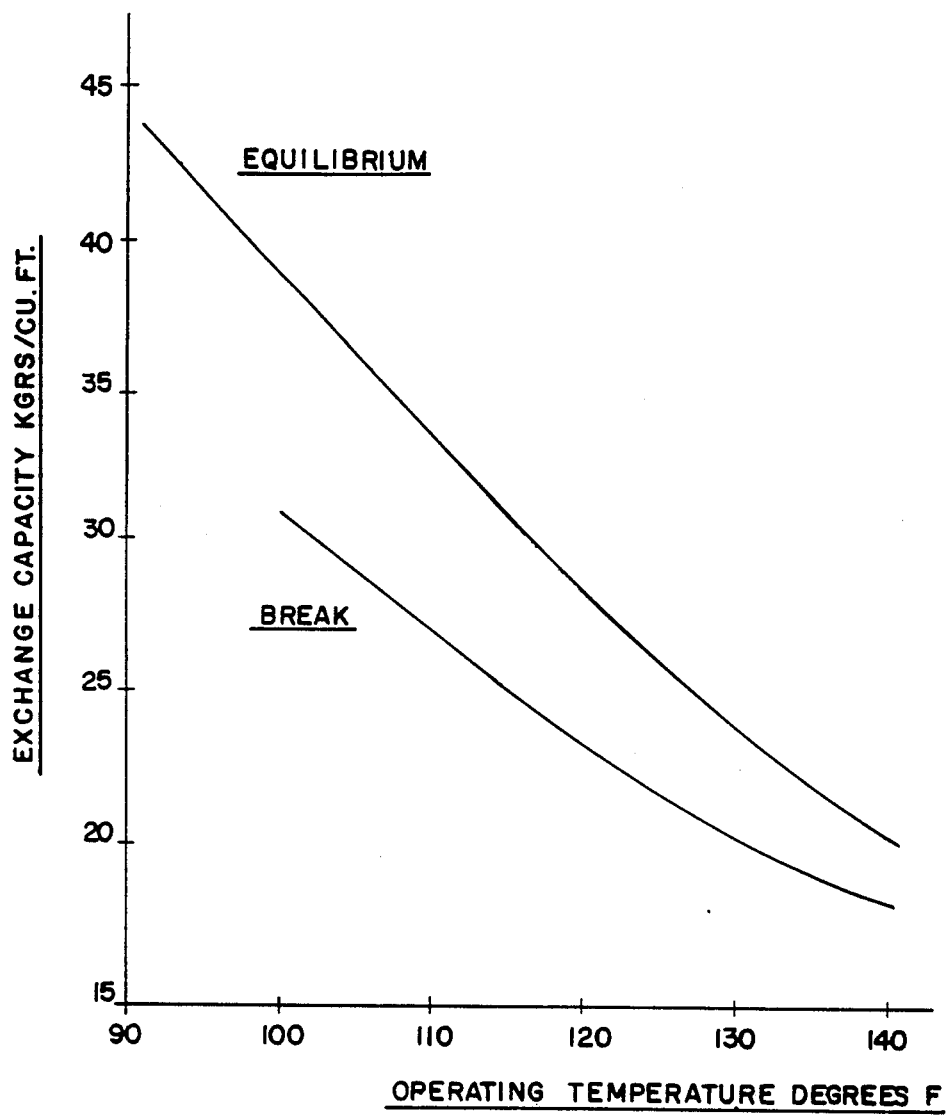
FIG. 3 is a graph showing the change in exchange capacity (kilograins per cubic foot) with temperature (°F.) for Dowex MWC-1 at equilibrium and at the breakthrough point.
Figure 4:
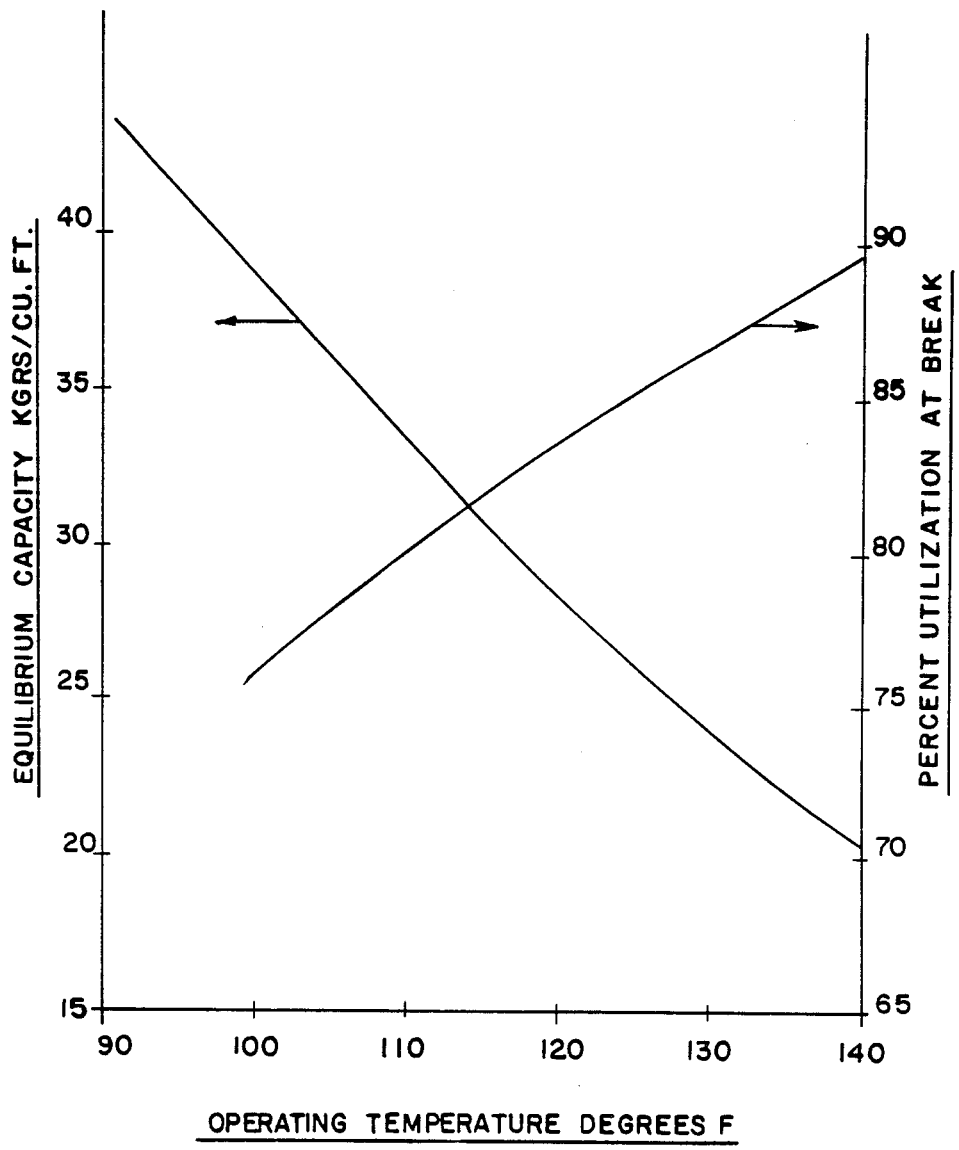
FIG. 4 is a graph showing the change in equilibrium capacity (kilograins per cubic foot) and the percent utilization of the resin at the breakthrough point with temperature (°F.) for Dowex MWC-1.

FIGS. 3 and 4 show the effect of temperature on equilibrium capacity, breakthrough capacity and utilization. As the equilibrium capacity is reduced with increasing temperature, utilization at the breakthrough point is increased due to increased ion exchange kinetics.

Figure 5:
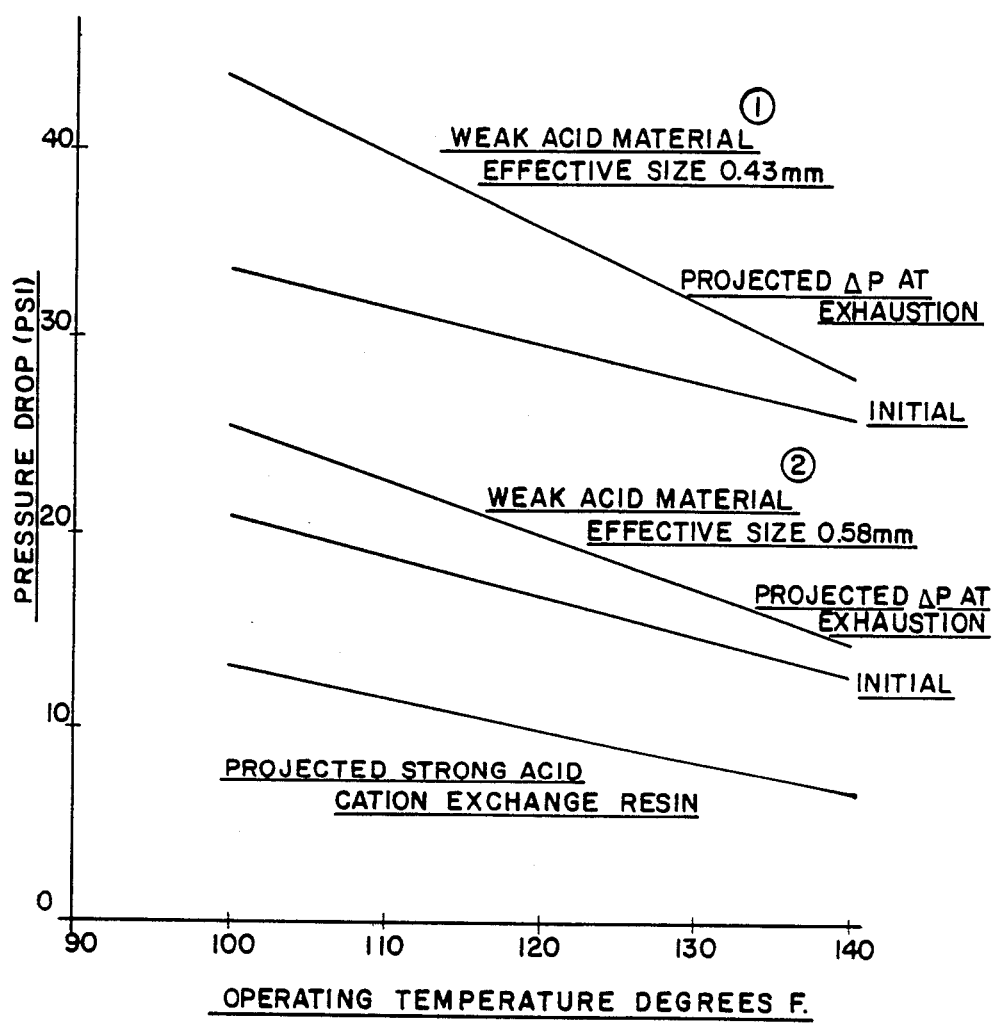
FIG. 5 is a graph showing the pressure drop (pounds per square inch) as a function of temperature (°F.) for Dowex MWC-1.

FIG. 5 shows the pressure drop (as ΔP) in pounds per square inch versus operating temperature in °F. for Dowex MWC-1.

Figure 6:
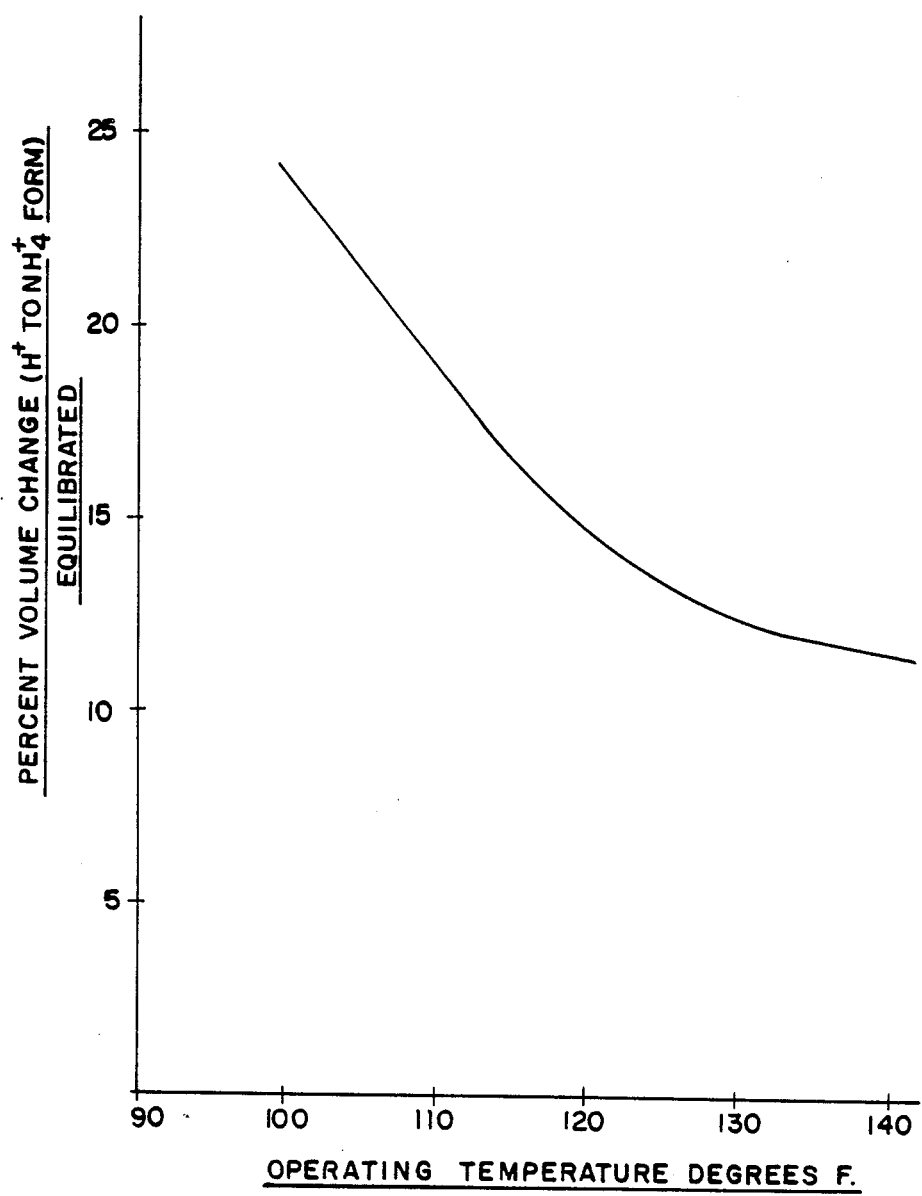
FIG. 6 is a graph showing resin swelling (percent volume change) with temperature (°F.) for Dowex MWC-1.

Resin bead swelling, upon conversion of Dowex MWC-1 from the hydrogen to the ammonia form, at different temperatures, is shown in FIG. 6. The apparent dependence of swelling on temperature is more likely a function of the extent of exhaustion, since equilibrium capacity varies with temperature in the same manner as swelling.

As indicated in Table 5, a substantial quantity of sodium ions were removed from a solution by Dowex MWC-1 under the conditions tested. Influent sodium ion concentrations of 100 ppb (in Run Number 10) at 140° F. and 550 ppb (in Run Number 11) at about 120° F. were reduced to approximately 0.4 ppb and 1 ppb, respectively. In both cases, sodium removal was independent of the ammonia breakthrough point, the sodium breakthrough point occurring well after the ammonia breakthrough point. Table 5 also summarizes the results obtained upon sodium and ammonia loading at the ammonia breakthrough point, the ammonia equilibrium point and the sodium breakthrough point.

TABLE 5

| | (Runs 10–12) | | |
|---|---|---|---|
| Run No. | 10 | 11 | 12 |
| Temperature (°F.) | 140 | 118 | 90 |
| Bed Height (inches) | 36 | 26 | 36 |
| Influent NH$_3$ (ppm NH$_3$) | 2.3 | 2 | 2.0 |
| Influent Na (ppb Na) | 100 | 550 | 50 |
| begun at (hours) | 22 | 8 | 0 |
| Effluent NH$_3$ (ppb) | <10 | <10 | <10 |
| Na(ppb) (±0.1) | 0.4 | 1 | 0.5 |
| Conductivity (micromhos) | 0.12–0.14 | 3.4–4.3 | 0.12 |
| pH | 4.8–5.4 | 5.0–5.9 | Neutral to MO, P |
| Run Length to NH$_3$ break (hrs) | 48 | 70 | 40 |
| to NH$_3$ equil. (hrs) | 67 | 100 | 78 |
| to Na break | >66 | 95 | 60 |
| to Na equil. | >70 | >120 | >120 |
| Loading (eq/l) at NH$_3$ break | | | |
| NH$_3$ | 0.0897 | 0.82 | 1.40 |
| Na | 0.016 | 0.205 | 0.050 est. |
| Total | 0.913 | 1.03 | 1.45 |
| Loading (eq/l) at NH$_3$ equil. | | | |
| NH$_3$ | 1.15 | 0.978 | 2.04 |
| Na | 0.026 | 0.304 | 0.098 |
| Total | 1.18 | 1.28 | 2.14 |
| Loading (eq/l) at Na break | | | |
| NH$_3$ | 1.15 | 0.978 | 2.04 |
| Na | 0.026 | 0.313 | 0.089 |
| Total | 1.18 | 1.55 | 2.13 |
| Loading at end of run | | | |
| NH$_3$ | 1.15 | 0.978 | 2.04 |
| Na | 0.026 | 0.457 | 0.098 |
| Total | 1.18 | 1.44 | 0.098 |
| K$_b$[1] (equilibrium) | not equilibrated | 0.70 | 0.79 |
| ΔP Initial (psi) | 26 | 20 | 5 |
| ΔP Final (psi) | 38 | 54 | 15 |

[1]K$_b$ = (RNa) (NH$_4^+$)/(RNH$_4$) (Na+)

While the mechanism of sodium removal is not entirely clear, it appears from the data obtained in these runs that prior to the ammonia breakthrough point, sodium is exchanged to the detriment of ammonia removal; i.e., ammonia leakage should be equivalent to the amount of sodium removed.

The data in Table 5 demonstrate that the use under condensate polishing conditions of a weakly acidic cation exchange resin having a pK$_a$ less than about 5.8 effectively removed both sodium ions and ammonia from a condensate solution. In particular, the removal of sodium ions and ammonia was greater than 99% at temperatures from 90° to 140 ° F.

EXAMPLE 3

One gram of dry ground (100–325 Mesh) Amberlite IRC-50 (Rohm and Haas Co., Philadelphia, PA), a methacrylic acid-divinylbenzene type weakly acidic cation exchange resin having an ionization constant (pKa) of about 6.1, was prepared as an aqueous slurry with 1 gram of a dry, powdered strongly basic anion exchange resin in the hydroxide form [Powdex PAO (The Graver Company, Union, NJ)]. In a preferred embodiment, the weakly acidic cation exchange resin has particle size in the range of about 1 to 150 microns.

The slurry was prepared as a precoat filter as described in U.S. Pat. Nos. 3,250,703 and 3,779,386, which are assigned to the assignee of the present application and which are incorporated herein by reference. Filter including a precoat only a weakly acidic cation exchange resin can be prepared in a similar manner. This example (although it relates to the use of a mixed bed containing a weakly acidic cation exchange resin and a strongly basic anion exchange resin) is included primarily to demonstrate the use of a weakly acidic cation exchange resin having a pK$_a$ greater than 5.8 under condensate polishing conditions.

Two condensate polishing runs were made at a flow rate of 4 gpm/ft$^2$ (gallons per minute per square foot) and at a temperature of 50° C. (approximately 122 ° F.) with condensate samples as described in Table 6. The effluent conductivity and thus the concentration of impurities in the effluent were measured after 4 hours by means of conductivity and acid conductivity techniques as previously described (after passage through a well-rinsed column of a strongly acidic type cation exchange resin). The data for these runs are presented in Table 6.

TABLE 6

CONDENSATE POLISHING RUNS WITH A PRECOAT FILTER INCLUDING A WEAKLY ACIDIC CATION EXCHANGE RESIN (pKa 6.1)

| RUN No. | INFLUENT pH | INFLUENT Na(ppb)[1] | INFLUENT NH$_3$(ppb) | INFLUENT ACID CONDUCTIVITY (micromhos) | EFFLUENT Na(ppb) | EFFLUENT NH$_3$(ppb) | EFFLUENT ACID CONDUCTIVITY (micromhos) |
|---|---|---|---|---|---|---|---|
| 1 | 9.6 | 400 | 2000 | 5.6 | 10 | 1500 | 0.07 |
| 2 | 9.6 | 100 | 2000 | 1.4 | 1 | 1500 | 0.07 |

[1]Added as an aqueous sodium chloride solution (10% of NaCl by weight).

As indicated in Table 6, the use under condensate polishing conditions of a weakly acidic cation exchange resins having a pK$_a$ of about 6.1, when combined with a strongly basic anion exchange resin to form a precoat filter, effectively removes sodium ions from a condensate solution, but removes only a relatively small amount of ammonia. In particular, the removal of sodium ions was greater than 97%, while only 25% of the influent ammonia was removed.

Thus, a weakly acidic cation exchange resin having a pK$_a$ greater than about 5.8 when used as the sole component of a pretreatment bed would not achieve the desired result of removing ammonia and other volatile amines along with corrosion products and metal ions.

CONCLUSION

As described herein, a single bed ion exchange system including a weakly acidic cation exchange resin having a pK$_a$ less than about 5.8 (for example, Dowex MWC-1)

when used to pretreat condensate before passage through a conventional mixed bed substantially removes impurities including ammonia and metal ions from a solution under condensate polishing conditions. That result would not be expected by one of ordinary skill in the art of ion exchange.

As shown in Table 5 and as described in example 2, ammonia added at a concentration of about 2 parts per million to the influent of the pretreatment bed was removed to concentrations in the effluent of less than 10 parts per billion. Sodium ions, introduced to the influent at concentrations from 50 to 550 parts per billion were reduced to concentrations from 0.5 to 1.0 parts per billion after passage through the bed. This represents much better than ninety percent removal (in particular, about ninety-nine percent removal) of impurities from the influent. Those results were obtained for the described bed system upon operation at temperatures from about 90° F. to 140° F. and at a flow rate of about 50 gallons per minute per square foot.

The quantity of acid required to regenerate the cation exchange resin of the pretreatment bed was reduced by a factor of at least 3 relative to the quantity of acid required to regenerate the cation exchange resin of a single bed comprising a strongly acidic cation exchange resin or a mixed bed comprising a mixture of strongly acidic cation and strongly basic anion exchange resins.

A weakly acidic cation exchange resin according to the present invention can also be formed as an aqueous slurry and used to form a precoat filter as described in U.S. Pat. Nos. 3,250,703 and 3,779,386, which are assigned to the assignee of the present application and which is incorporated herein by reference. Such a precoat filter effectively removes ammonia and other volatile amines along with corrosion products and metal ions when used under the temperature conditions described above for the operation of a pretreatment bed system. A precoat filter, however, is usually used at a low rate of less than 10 gallons per minute per square foot.

While the present invention has been described with reference to a particular embodiment, it will be understood that various changes and modifications can be made without departing from the spirit thereof, particularly as defined in the following claims.

We claim:

1. A method for removing impurities including ammonia and sodium ions from a liquid comprising the steps of:
   (a) preparing a bed of filter materials including a cation exchange resin having a $pK_a$ in the range of about 3.5 to 5.8; and
   (b) passing the liquid through the bed at a temperature less than 200° F. and at a flow rate of less than about 75 gallons per minute per square foot to substantially remove the impurities and purify the liquid.

2. The method according to claim 1 wherein the cation exchange resin is an acrylic acid-containing copolymer.

3. The method according to claim 1 further including the step of passing an aqueous solution of a strong acid through the cation exchange resin to regenerate said cation exchange resin.

4. The method according to claim 1 wherein the liquid is passed through the bed at a temperature in the range of about 80° F. to 190° F.

5. The method according to claim 1 wherein the liquid is passed through the bed at a temperature in the range of about 115° F. to 140° F.

6. The method according to claim 1 wherein the liquid is passed through the bed at a flow rate in the range of about 25 to 50 gallons per minute per square foot.

7. The method according to claim 1 wherein the cation exchange resin is in the hydrogen form.

8. The method according to claim 1 wherein the impurities include volatile amines having $pK_b$ less than about 5.0.

9. The method according to claim 1 wherein, after the liquid is passed through the bed, the total concentration of sodium ion impurities remaining in the liquid is less than about 1 part per billion.

10. A method for removing impurities including ammonia and sodium ions from a liquid before passage of the liquid through a mixed bed including a first cation exchange resin and an anion exchange resin comprising the steps of:
    (a) preparing a bed of filter materials including a second cation exchange resin having a $pK_a$ in the range of about 3.5 to 5.8; and
    (b) passing the liquid through the bed at a temperature less than 200° F. and at a flow rate of less than about 75 gallons per minute per square foot to substantially remove the impurities and purify the liquid.

11. The method according to claim 10 wherein the second cation exchange resin is an acrylic acid-containing copolymer.

12. The method according to claim 10 further including the step of passing an aqueous solution of a strong acid through the second cation exchange resin to regenerate said cation exchange resin.

13. The method according to claim 10 wherein the liquid is passed through the bed at a temperature in the range of about 80° F. to 190° F.

14. The method according to claim 10 wherein the liquid is passed through the bed at a temperature in the range of about 115° F. to 140° F.

15. The method according to claim 10 wherein the liquid is passed through the bed at a flow rate in the range of about 25 to 50 gallons per minute per square foot.

16. The method according to claim 10 wherein the second cation exchange resin is in the hydrogen form.

17. The method according to claim 10 wherein the impurities include volatile amines having $pK_b$ less than about 5.0.

18. The method according to claim 10 wherein, after the liquid is passed through the bed, the total concentration of sodium ion impurities remaining in the liquid is less than about 1 part per billion.

19. A method for removing impurities including ammonia and sodium ions from a liquid before passage of the liquid through a mixed bed including a first cation exchange resin and an anion exchange resin comprising the steps of:
    (a) preparing a bed of filter materials including a second cation exchange resin which is an acrylic acid-containing copolymer having a $pK_a$ in the range of about 4.0 to 5.8; and
    (b) passing the liquid through the bed at a temperature in the range of about 80° F. to 190° F. and at a flow rate in the range of about 25 to 50 gallons per minute per square foot to substantially remove the impurities and to purify the liquid.

20. The method according to claim 19 further including the step of passing an aqueous solution of a strong acid through the second cation exchange resin to regenerate said cation exchange resin.

21. The method according to claim 19 wherein the second cation exchange resin is in the hydrogen form.

22. The method according to claim 19 wherein the impurities include volatile amines having a $pK_b$ less than about 5.0.

23. The method according to claim 19 wherein, after the liquid is passed through the bed, the total concentration of sodium ion impurities emaining in the liquid is less than about 1 part per billion.

24. A method for removing impurities including ammonia and sodium ions from a liquid before passage of the liquid through a mixed bed including a first cation exchange resin and an anion exchange resin comprising the steps of:
  (a) preparing a liquid slurry of filter particles in the range of about 1 to 150 microns including a second cation exchange resin having a $pK_a$ in the range of about 3.5 to 5.8;
  (b) precoating a porous support means with said slurry to form a precoat layer; and
  (c) passing the liquid through said precoat layer and said porous support means at a temperature less than 200° F. and at a flow rate of less than about 10 gallons per minute per square foot to substantially remove the impurities and purify the liquid.

25. The method according to claim 24 further including the step of passing an aqueous solution of a strong acid through said precoat layer and said porous support means to regenerate the cation exchange resin.

26. The method according to claim 24 wherein the liquid is passed through said precoat layer and said porous support means at a temperature in the range of about 80° F. to 190° F.

27. The method according to claim 24 wherein the liquid is passed through said precoat layer and said porous support means at a temperature in the range of about 115° F. to 140° F.

28. The method according to claim 24 wherein the liquid is passed through said precoat layer and said porous support means at a flow rate in the range of about 1 to 10 gallons per minute per square foot.

29. The method according to claim 24 wherein the second cation exchange resin is in the hydrogen form.

30. The method according to claim 24 wherein the impurities include volatile amines having $pK_b$ less than about 5.0.

31. The method according to claim 24 wherein, after the liquid is passed through said precoat layer and said porous support means, the total concentration of sodium ion impurities remaining in the liquid is less than about 1 part per billion.

32. A method for removing impurities including ammonia and sodium ions from a liquid before passage of the liquid through a mixed bed including a first cation exchange resin and an anion exchange resin comprising the steps of:
  (a) preparing a liquid slurry of filter particles including a second cation exchange resin which is an acrylic acid-containing copolymer having a $pK_a$ in the range of about 4.0 to 5.8;
  (b) precoating a porous support means with said slurry to form a precoat layer; and
  (c) passing the liquid through said precoat layer and said porous support means at a temperature in the range of about 80° F. and at a flow rate in the range of about 1 to 10 gallons per minute per square foot to substantially remove the impurities and to purify the liquid.

33. The method according to claim 32 further including the step of passing an aqueous solution of a strong acid through said precoat layer and said porous support means to regenerate the cation exchange resin.

34. The method according to claim 32 wherein the second cation exchange resin is in the hydrogen form.

35. The method according to claim 32 wherein the impurities include volatile amines having a $pK_b$ less than about 5.0.

36. The method according to claim 32 wherein, after the liquid is passed through said precoat layer and said porous support means, the total concentration of sodium ion impurities remaining in the liquid is less than about 1 part per billion.

* * * * *